(12) United States Patent
Choudhary et al.

(10) Patent No.: US 11,597,023 B2
(45) Date of Patent: Mar. 7, 2023

(54) HYBRID THREADING TAP WITH REAMER PORTION AND THREAD CUTTING PORTION

(71) Applicant: GM GLOBAL TECHNOLOGY OPERATIONS LLC, Detroit, MI (US)

(72) Inventors: Lokesh Choudhary, Bangalore (IN); Tiruttani Munikamal, Bangalore (IN); Qigui Wang, Rochester Hills, MI (US); David A. Wulbrecht, Clarkston, MI (US)

(73) Assignee: GM GLOBAL TECHNOLOGY OPERATINS LLC, Detroit, MI (US)

( * ) Notice: Subject to any disclaimer, the term of this patent is extended or adjusted under 35 U.S.C. 154(b) by 0 days.

(21) Appl. No.: 17/181,438

(22) Filed: Feb. 22, 2021

(65) Prior Publication Data
US 2022/0266366 A1    Aug. 25, 2022

(51) Int. Cl.
*B23G 5/20* (2006.01)

(52) U.S. Cl.
CPC .......... *B23G 5/20* (2013.01); *B23G 2200/147* (2013.01)

(58) Field of Classification Search
CPC ... B23G 5/06; B23G 5/20; B23G 7/02; B23G 2200/142; B23G 2200/146; B23G 2200/147
See application file for complete search history.

(56) References Cited

U.S. PATENT DOCUMENTS

| | | | | |
|---|---|---|---|---|
| 2,300,310 A * | 10/1942 | Poeton | ..................... | B23G 5/06 408/219 |
| 2,816,302 A * | 12/1957 | Bauer | ..................... | B23G 5/06 470/84 |
| 3,245,099 A * | 4/1966 | Zagar | ..................... | B63C 11/04 408/219 |
| 3,251,080 A * | 5/1966 | Sharon | ..................... | B23G 5/06 470/84 |
| 4,271,554 A * | 6/1981 | Grenell | ..................... | B23G 5/20 470/204 |
| 6,931,901 B2 * | 8/2005 | Ghiran | ..................... | B21D 28/28 72/370.27 |
| 7,150,588 B2 * | 12/2006 | Hakansson | ............. | B23G 7/02 408/222 |
| 7,441,433 B2 * | 10/2008 | Ghiran | ..................... | B23G 7/02 72/71 |
| 7,552,610 B2 * | 6/2009 | Fujiuchi | ..................... | B23G 5/20 470/84 |

(Continued)

FOREIGN PATENT DOCUMENTS

| | | | |
|---|---|---|---|
| DE | 1681887 U | 8/1954 | |
| DE | 2244623 A * | 3/1974 | ............... B21K 1/56 |

(Continued)

*Primary Examiner* — Eric A. Gates
(74) *Attorney, Agent, or Firm* — Lorenz & Kopf LLP

(57) ABSTRACT

A hybrid threading tap includes a reamer portion and a thread cutting portion having a plurality of cutting teeth. The thread cutting portion is arranged with the reamer portion along the longitudinal axis. The reamer portion is configured to be advanced within a hole of a workpiece to plastically deform and expand the hole to an expanded hole and provide the expanded hole with a zone of residual compressive stress. The plurality of cutting teeth is configured to cut a threading into the expanded hole within the zone.

16 Claims, 3 Drawing Sheets

(56) References Cited

U.S. PATENT DOCUMENTS

| | | | | |
|---|---|---|---|---|
| 7,625,292 B2* | 12/2009 | Glimpel | .................. | B23G 5/06 |
| | | | | 408/222 |
| 8,220,301 B2* | 7/2012 | Ghiran | .................... | B23G 5/20 |
| | | | | 72/71 |
| 8,794,879 B2* | 8/2014 | Durst | ...................... | B23G 5/18 |
| | | | | 407/119 |
| 2021/0016376 A1* | 1/2021 | Kopton | .................. | B23G 3/08 |

FOREIGN PATENT DOCUMENTS

| | | | | |
|---|---|---|---|---|
| DE | 19911308 A1 | * | 9/2000 | ............. B21J 5/066 |
| DE | 102006010651 A1 | | 9/2007 | |
| EP | 0026787 A1 | * | 4/1981 | |
| JP | 05253747 A | * | 10/1993 | |
| WO | 2019049078 A1 | | 3/2019 | |

\* cited by examiner

HYBRID THREADING TAP WITH REAMER PORTION AND THREAD CUTTING PORTION

INTRODUCTION

The technical field generally relates to a threading tap and, more particularly, relates to a hybrid threading tap with a reamer portion and a thread cutting portion.

Some parts include threaded holes for threaded attachment to another component. For example, vehicle engine blocks often include a threaded hole for receiving, supporting, and threadably attaching to a bearing component. More specifically, the engine block may include a main bearing bolt hole that is threaded. Preferably, these and other types of threaded holes have high fatigue resistance, high load retention strength, and other advantageous performance characteristics.

However, available methods for threading holes may be suboptimized in certain respects. The threading tools, machinery, systems, etc. that are currently available may similarly be less than optimal. These limitations may be exacerbated in high-volume manufacturing processes. Accordingly, performance of the manufactured threaded hole and the respective threaded attachment is limited. Furthermore, manufacturing methods and systems of this type may be inefficient or may suffer from other problems.

Therefore, it is desirable to provide improved methods and systems for manufacturing parts with high-quality threaded holes. It is also desirable to provide improved methods and systems for manufacturing parts with threaded holes having high fatigue resistance and high load retention strength. Furthermore, it is desirable to provide manufacturing efficiencies in these systems and methods. Other desirable features and characteristics of the present disclosure will become apparent from the subsequent detailed description and the appended claims, taken in conjunction with the accompanying drawings and the foregoing technical field and background.

SUMMARY

A hybrid threading tap that defines a longitudinal axis is provided. In one embodiment, the hybrid threading tap includes a reamer portion and a thread cutting portion having a plurality of cutting teeth. The thread cutting portion is arranged with the reamer portion along the longitudinal axis. The reamer portion is configured to be advanced within a hole of a workpiece to plastically deform and expand the hole to an expanded hole and provide the expanded hole with a zone of residual compressive stress. The plurality of cutting teeth is configured to cut a threading into the expanded hole within the zone.

In some embodiments, the reamer portion includes a smooth outer radial surface.

In some embodiments, the reamer portion includes an outer radial surface that is tapered with respect to the longitudinal axis.

Also, in some embodiments, the thread cutting portion is tapered along the longitudinal axis.

Furthermore, in some embodiments, the outer radial surface of the reamer portion defines a first taper angle with respect to the longitudinal axis. Additionally, the thread cutting portion defines a second taper angle with respect to the longitudinal axis. The first taper angle is different from the second taper angle.

In some embodiments, the thread cutting portion is arranged end-to-end with the reamer portion along the longitudinal axis.

In some embodiments, the reamer portion has a leading end and a trailing end. The leading end has a leading width, and the trailing end has a trailing width. The trailing width is, at most, two percent (2%) larger than the leading width for expanding the hole, at most, two percent (2%).

In some embodiments, the reamer portion and the thread cutting portion are integrally connected and have common material characteristics.

Moreover, in some embodiments, the reamer portion and the thread cutting portion have different material characteristics. In some embodiments, the reamer portion and the thread cutting portion are made of different materials. Furthermore, in some embodiments, one of the reamer portion and the thread cutting portion has a different heat treatment from the other to provide different material characteristics. Also, in some embodiments, one of the reamer portion and the thread cutting portion has a different coating from the other to provide different material characteristics.

In some embodiments, the plurality of cutting teeth is arranged in a first land and a second land with a chip opening separating the first land and the second land in a circumferential direction about the longitudinal axis. The chip opening extends along the longitudinal axis through the thread cutting portion and configured to receive chips during cutting of the threading into the expanded hole.

Furthermore, a method of manufacturing a hybrid threading tap is provided. In one embodiment, the method includes forming a reamer portion on a shaft having a longitudinal axis. The method also includes forming a thread cutting portion on the shaft to include a plurality of cutting teeth. The thread cutting portion is arranged with the reamer portion along the longitudinal axis. The reamer portion is configured to be advanced within a hole of a workpiece to plastically deform and expand the hole to an expanded hole and provide the expanded hole with a zone of residual compressive stress. Also, the plurality of cutting teeth is configured to cut a threading into the expanded hole within the zone.

In some embodiments, the method includes attaching a first body to a second body arranged together along the longitudinal axis. The first body and the second body have different material characteristics. Forming the reamer portion includes forming the reamer portion on the first body. Also, forming a thread cutting portion includes forming the thread cutting portion on the second body.

In some embodiments, forming the reamer portion and forming the thread cutting portion includes additively manufacturing at least one of the reamer portion and the thread cutting portion.

Additionally, in some embodiments, the method includes at least one of: heat treating one of the reamer portion and the thread cutting portion to provide the one with a different material characteristic from the other; and coating one of the reamer portion and the thread cutting portion to provide the one with a different material characteristic from the other.

In some embodiments, forming the reamer portion includes forming the reamer portion to include a smooth outer radial surface that is tapered with respect to the longitudinal axis. Also, forming the thread cutting portion includes forming the thread cutting portion to be tapered along the longitudinal axis.

In some embodiments, forming the reamer portion includes forming the reamer portion to have a leading end and a trailing end. The leading end has a leading width and the trailing end has a trailing width. The trailing width is, at most, two percent (2%) larger than the leading width for expanding the hole, at most, two percent (2%).

Moreover, a method of forming a threaded hole in a cast workpiece using a hybrid threading tap in a single stroke is disclosed. In one embodiment, the method includes providing a cast workpiece with a hole. The method also includes advancing, in the single stroke, a reamer portion of the hybrid threading tap within the hole to plastically deform and expand the hole to an expanded hole and to provide the expanded hole with a zone of residual compressive stress. The method also includes cutting, in the single stroke, a threading into the expanded hole within the zone using a thread cutting portion of the hybrid threading tap. The thread cutting portion includes a plurality of cutting teeth. The thread cutting portion is arranged with the reamer portion along the longitudinal axis.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
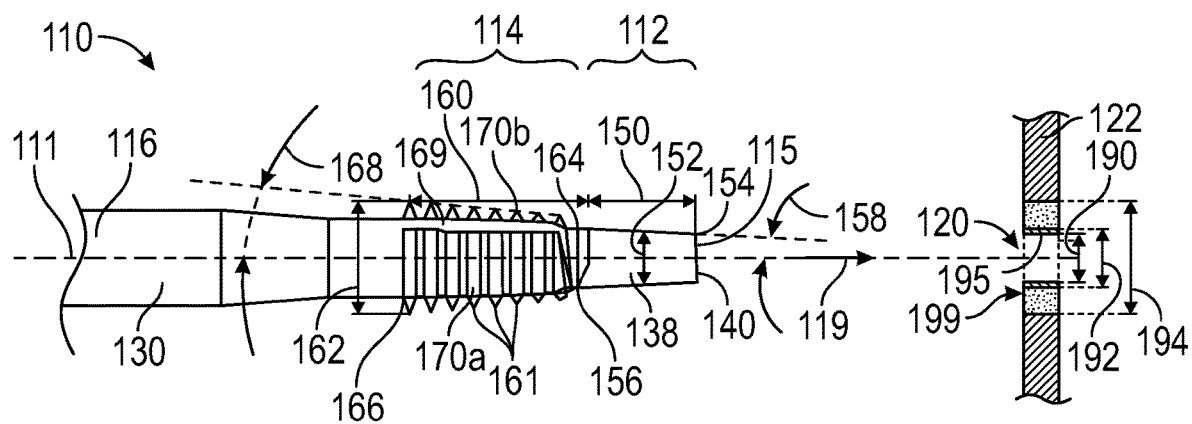
FIG. 1 is a side view of a hybrid threading tool shown in accordance with embodiments of the present disclosure.

The following detailed description is merely exemplary in nature and is not intended to limit the application and uses. Furthermore, there is no intention to be bound by any expressed or implied theory presented in the preceding introduction, brief summary or the following detailed description.

Generally, the present disclosure relates to manufacturing systems and methods for threading a hole in a workpiece, part, component, etc. The threaded hole provided using these systems and methods may provide high fatigue resistance, high load retention strength, and/or other improved characteristics.

In various embodiments, a hybrid threading tool (a hybrid threading tap) is provided that includes both a reamer portion and a thread cutting portion. The reamer portion and the thread cutting portion may be attached and arranged along a longitudinal axis of the hybrid tool. The reamer portion may be arranged on a leading end of the tool. The reamer portion may have a smooth, tapered outer radial surface. The reamer portion may be configured for plastically deforming and expanding a hole in a workpiece as the tool is advanced into the hole along the longitudinal axis (without removal of material from the workpiece). The reamer portion may, thus, densify the material within a zone of the workpiece that is proximate the hole leaving residual compressive stress in this zone. The thread cutting portion may be arranged further along the axis from the leading end and may include a plurality of cutting teeth. The plurality of cutting teeth may be configured for cutting threading into the expanded hole. Thus, the threading may be formed by the thread cutting portion in the zone of compressive stress that was previously created by the reamer portion. Accordingly, the threaded hole may exhibit high fatigue resistance, high load retention strength, and/or other improved characteristics. Methods of making and using the hybrid tap are also disclosed according to various embodiments.

The hybrid tap may have a variety of configurations. The shape, axial length, taper angle, diameter, and/or other features of the reamer portion may be tailored and chosen for controlled plastic deformation and expansion of the hole in the workpiece. Likewise, the shape, axial length, taper angle, diameter, and/or other features of the thread cutting portion may be tailored and chosen for cutting the threading in the hole in a controlled manner.

In some embodiments, the reamer portion and the thread cutting portion may exhibit different material characteristics. For example, the different portions may be made from different materials, may have different heat treatments, different coatings, etc. The material characteristics may be chosen for increasing performance of the reamer portion and thread cutting portion.

The hybrid tools and the associated methods of the present disclosure increase convenience and efficiency when forming threaded holes. The tools and the associated methods provide threaded holes having increased fatigue resistance, higher load retention strength, and other benefits.

The systems and methods of the present disclosure may be used for threading a wide variety of parts. In some embodiments, the tool may be used for manufacturing one or more threaded holes in a vehicle engine block, cylinder head, low crankcase extension (LCE), etc. The threaded hole may be provided in a main bearing bolt hole of an engine block in some embodiments. The manufacturing systems and methods may be useful for threading holes in a cast part (e.g., a cast aluminum part), and the tools and methods of the present disclosure may be used in parts that are manufactured using advanced casting techniques. However, it will be appreciated that the threading tools, systems, and methods of the present disclosure may be employed for any suitable part without departing from the scope of the present disclosure.

Referring to FIG. 1, a hybrid threading tap 110 is illustrated according to example embodiments of the present disclosure. The tap 110 may be elongate and may extend along a straight longitudinal axis 111 between a first end 115 and a second end 116. The tap 110 may be configured for reaming and threading a hole 120 in a workpiece 122. The tap 110 increases manufacturing efficiency, for example, when high-quality threaded holes are needed in manufactured parts.

Generally, the tap 110 may include a reamer portion 112 and a thread cutting portion 114 that are disposed and arranged along the axis 111. Thus, the tap 110 may be referred to as a hybrid expander/threading tap 110. During use, the reamer portion 112 of the hybrid threading tap 110 may be configured to reaming the hole 120 by plastically deforming and expanding a previously-formed hole 120 in the workpiece 122 (without removing material from the workpiece 122). The thread cutting portion 114 of the tap 110 may subsequently cut threads in the expanded hole.

More specifically, the reamer portion 112 may plastically deform and expand the hole, thereby densifying the area surrounding the expanded hole, and leaving residual stress in this area. The thread cutting portion 114 may cut into this conditioned area surrounding the expanded hole as the tap 110 advances further into the workpiece 122, leaving a high-quality threaded hole. Thus, the hole may be expanded (e.g., reamed, etc.) and subsequently threaded during a single stroke of the tap 110 (i.e., during advancement generally along the axis 111 in a single direction (indicated by arrow 119) toward the workpiece 122. As such, improvements in manufacturing efficiency and associated benefits are provided.

As shown in FIG. 1, the tap 110 may include an elongate shaft 130 that is cylindrical and centered on the axis 111. The shaft 130 may have an external surface, at least part of which may be smooth. Portions of the shaft 130 may be tapered in some embodiments as well. In some embodiments, a handle may be included on the shaft 130 for grasping and manual use of the tap 110 (e.g., for advancement along the axis 111 and/or rotation about the axis 111). In additional embodiments, the shaft 130 may include a chuck for attachment to a machine for automatically actuating the tap 110 (e.g., for advancement along the axis 111 and/or rotation about the axis 111).

The reamer portion 112 of the tap 110 may be tapered and conic with a smooth outer radial surface 138. The outer radial surface 138 may be centered about the axis 111. In the illustrated embodiment, the reamer portion 112 may be frusto-conic with a face 140 that extends substantially normal to the axis 111. The face 140 may be circular and may define the first end 115 (i.e., the leading end) of the tap 110. In additional embodiments, the face 140 may be disposed at a non-perpendicular angle relative to the axis 111. In further embodiments, the outer radial surface 138 of the reamer portion 112 may be tapered down to a point, which defines the first end 115.

The reamer portion 112 may have a first axial end 154, which is defined at the face 140 (i.e., at the first end 115). The reamer portion 112 may have a second axial end 156, which is spaced apart along the axis 111 from the first end 115. The reamer portion 112 may have a length 150, which is measured along the axis 111 between the first and second axial ends 154, 156. The reamer portion 112 may have a width 152 (i.e., a diameter). The width 152 may vary along the length 150 such that the outer radial surface 138 is tapered or flared with respect to the axis 111. As such, the reamer portion 112 may gradually increase in width 152 from the first axial end 154 to the second axial end 156. The outer radial surface 138 may also define a taper angle 158. The outer radial surface 138 may be shaped with a single, solitary taper angle 158 in some embodiments.

The taper angle 158 may range between ten and forty-five degrees (10°-45°) in various embodiments. Furthermore, the taper angle 158 may range between thirty and forty-five degrees (30°-45°) in some embodiments. However, it will be appreciated that the taper angle 158 may be chosen according to various factors. In addition, the length 150, width 152, taper angle 158, surface finish, materials, and/or other characteristics of the reamer portion 112 may be tailored according to certain factors. These factors may include, the target amount of expansion for the hole 120, the hole type (through hole or blind hole), the materials of the workpiece 122, the dimensions of the hole 120, and/or other factors.

As shown in FIG. 1, the thread cutting portion 114 may have a first axial end 164 and a second axial end 166. The first axial end 164 may be proximate the second axial end 156 of the reamer portion 112. The second axial end 166 of the thread cutting portion 114 may be spaced apart from the first axial end 164 along the axis 111. In some embodiments, the reamer portion 112 and the thread cutting portion 114 may be arranged end-to-end along the axis 111 such that the second axial end 156 of the reamer portion 112 is substantially coincident with the first end 164 of the thread cutting portion 114. The thread cutting portion 114 may have a length 160, which is measured along the axis 111 between the first and second end 164, 166.

The thread cutting portion 114 may include a plurality of cutting teeth 161. The cutting teeth 161 may have a sawtooth profile and may have various thread dimensions for providing the hole 120 with desired threading. The major diameter of the cutting teeth 161 defines a width 162 dimension (i.e., diameter) of the thread cutting portion 114. The width 162 may vary along the length 160 of the thread cutting portion 114, such that the thread cutting portion 114 is tapered or flared, gradually increasing in width 162 from the first end 164 to the second end 166. The cutting teeth 161 may also define a taper angle 168. The thread cutting portion 114 may have a single, solitary taper angle 168 along the axis 111 in some embodiments.

The taper angle 168 of the thread cutting portion 114 may be different from the taper angle 158 of the reamer portion 112. In some embodiments, the taper angle 168 of the thread cutting portion 114 may be greater than the taper angle 158 of the reamer portion 112.

The taper angle 168 may range between ten and forty-five degrees (10°-45°) in various embodiments. Furthermore, the taper angle 168 may range between thirty and forty-five degrees (30°-45°) in some embodiments. However, it will be appreciated that the taper angle 168 may be chosen according to various factors. The length 160, width 162, taper angle 168, surface finish, materials, and/or other characteristics of the reamer portion 112 may be tailored according to the target threading for the hole 120, the materials used in the workpiece 122, the hole type, the dimensions of the hole 120, and/or other factors.

In some embodiments, the thread cutting portion 114 may include a plurality of threaded lands (e.g., a first land 170a and a second land 170b) that are separated in the circumferential direction by chip openings 169 (e.g., flutes). As shown, the cutting teeth 161 may be arranged in the first land 170a and the second land 170b with the chip opening 169 separating the lands 170a, 170b. The chip opening 169 may be a recessed slot that extends longitudinally along the thread cutting portion 114 from the first end 164 to the second end 166. The chip opening 169 may also blend and transition continuously into the second axial end 156 of the reamer portion 112. The teeth 161 may similarly transition continuously into the second axial end 156 of the reamer portion 112.

Although only two lands 170a, 170b and one chip opening 169 are illustrated, it will be appreciated that there may be more. For example, there may be at least three lands that are spaced apart equally about the axis 111 with respective chip openings defined between neighboring pairs of lands.

The reamer portion 112 and the thread cutting portion 114 may be arranged longitudinally in sequence along the axis 111. The reamer portion 112 may be arranged proximate and may, in some embodiments, define the leading end (i.e., the first end 115) of the tap 110. The thread cutting portion 114 may be disposed further along the axis 111 and may be directly adjacent to the reamer portion 112. There may be a gradual transition from the outer dimensions of the reamer portion 112 to those of the thread cutting portion 114.

Accordingly, the reamer portion 112 and thread cutting portion 114 may be coupled and attached to define a unitary, one-piece, hybrid tap 110 that provides the benefits of both expanding (e.g., reaming) the hole 120 and subsequently cutting threads in the expanded hole. The tap 110 may be used in a single threading operation (i.e., in a single stroke) such that the reamer portion 112 initially expands and plastically deforms the hole 120, and upon further advancement into the workpiece 122, the thread cutting portion 114 cuts threads into the expanded hole. The resulting threads may exhibit high fatigue resistance and high load retention strength. Thus, the threads manufactured using the tap 110 may retain a bolt and maintain the bolt load over a long operating lifetime.

Specifically, during use, the tap 110 may be provided with the first end 115 directed toward the workpiece 122 and with the tap 110 and hole 120 aligned along the axis 111 (FIG. 1). The tap 110 may be handled manually in some embodiments. In additional embodiments, the shaft 130 may be attached to an actuating machine that is configured to automatically advance the tap 110 along the axis 111 into the hole 120, withdraw the tap 110 from the hole 120 along the axis 111, and/or rotate the tap 110 about the axis 111 relative to the workpiece 122.

Figure 2:
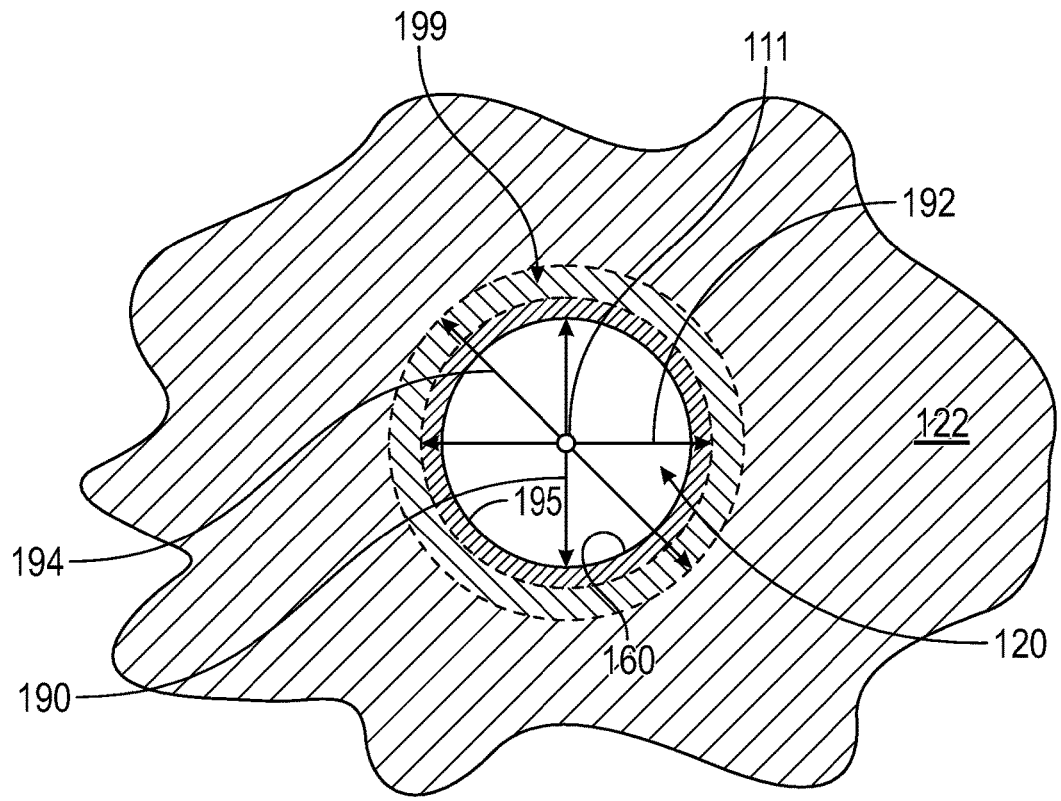
FIG. 2 is a plan view of a workpiece with a hole configured to be threaded by the hybrid threading tool of FIG. 1 according to example embodiments.

The hole 120 is shown in FIGS. 1 and 2. The hole 120 may be provided in the workpiece 122 in a number of ways without departing from the scope of the present disclosure. Initially, the hole 120 may be cast into the workpiece 122 (e.g., a cast aluminum engine part). In other embodiments, the hole 120 may be drilled, punched, or otherwise defined in the workpiece 122. The hole 102 may have a smooth inner diameter surface 195, which defines a first diameter dimension 190 (initial diameter). The hole 120 may be a through-hole that extends through a full wall thickness of the workpiece 122 as illustrated. In additional embodiments, the hole 120 may be a blind hole that is recessed through part of the thickness of the workpiece 122. The workpiece 122 may be a part of any suitable type. For example, the workpiece 122 may be an engine block in some embodiments. Also, the workpiece 122 may be a cast aluminum alloy engine block. The hole 120 may ultimately be used as a main bearing bolt hole for the engine block.

Figure 3:
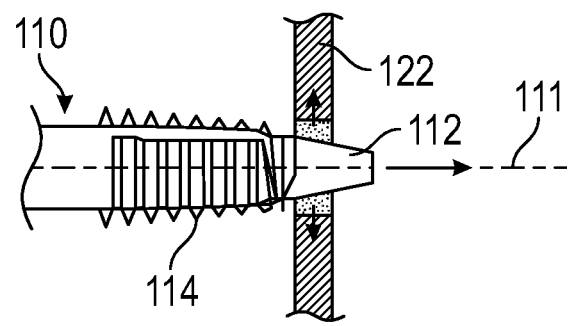
FIG. 3 is a side view of the hybrid threading tool of FIG. 1 shown during cold work expansion and reaming of the hole in the workpiece of FIG. 2 according to example embodiments.

The width 152 (FIG. 1) at the first end 115 of the tap 110 may be smaller than the first diameter dimension 190 (FIGS. 1 and 2) of the hole 120 to allow the tap 110 to be advanced into the hole 120. As the tap 110 advances, the outer radial surface 138 of the reamer portion 112 may abut the inner diameter surface 195 of the hole 120. The reamer portion 112 may be advanced further along the axis 111 and into the hole 120 as shown in FIG. 3. The reamer portion 112 may be advanced longitudinally until the second axial end 156 is received within the hole 120. The reamer portion 112 may exert sufficient force on the workpiece 122 to plastically deform and radially expand the inner diameter surface 195 of the hole 120 from the first diameter dimension 190 to the expanded width 192 (FIGS. 1 and 2).

The shape and dimensions of the reamer portion 112, the insertion pressure applied, and/or other variables may be chosen such that plastic deformation and expansion of the hole 120 is controlled. The taper angle 158, the rate of advancement of the tap 110, the applied insertion pressure, and/or other parameters may be chosen to control the expansion of the hole 120. The reamer portion 112 may be advanced into the workpiece 122 such that the expanded width 192 is substantially equal to the width 152 at the second axial end 156 of the reamer portion 112. The width 152 at the second axial end 156 may, thus, be selected to control the expanded width 192 of the hole 120.

The reamer portion 112 may also densify the material of the workpiece 122 as it expands the hole 120 from the first diameter dimension 190 to the expanded width 192. More specifically, the plastic deformation performed during radial expansion of the hole 120 may reduce porosity of the material within a zone 199. The zone 199 is indicated schematically in FIGS. 1 and 2 as an annular area radiating outward from the inner surface 195, defined in the radial direction between the expanded width 192 and outer boundary width 194 dimensions. By densifying the material within the zone 199, the reamer portion 112 of the tap 110 may increase residual compressive stress within the zone 199.

It will be appreciated that the reamer portion 112 may expand and densify the hole 120 via a cold work process. Furthermore, it will be appreciated that the reamer portion 112 may be configured for hot working the workpiece 122 when expanding the hole 120. In other words, there may be a heat source for applying heat above the recrystallization temperature of the workpiece 122 during plastic deformation and expansion of the hole 120. This may allow the material to recrystallize during deformation. Like the cold working embodiments illustrated, the hot working process may densify the zone 199, reduce porosity therein, and/or provide other benefits.

The reamer portion 112 may be advanced at a chosen velocity, acceleration, pressure, etc. according to various factors relating to the workpiece 122. For example, these variables may be set according to the change in ductility of the material of the workpiece 122 during expansion. One or more variables may be set according to the amount of heat generated during expansion. The variable(s) may be chosen according to the amount of densification (reduction of porosity) of the workpiece 122. These settings may provide the workpiece 122 with predetermined residual stress within the zone 199.

Additionally, in some embodiments, the reamer portion 112 may be advanced along the axis 111 to expand the hole 120 while the tap 110 remains at a fixed angular position. In other embodiments, the tap 110 may be rotated about the axis 111 as the reamer portion 112 advances into and expands the hole 120. As the thread cutting portion 114 approaches the workpiece 122, however, the tap 110 may be rotated about the axis 111 to allow the cutting teeth 161 to remove material and begin cutting threading therein.

Figure 4:
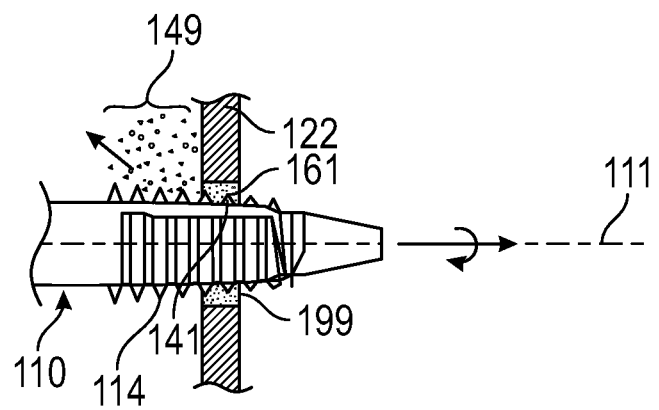
FIG. 4 is a side view of the hybrid threading tool of FIG. 1 shown cutting threading in the expanded hole of FIG. 3 according to example embodiments.

More specifically, as the tap 110 continues to advance along the axis 111 into the workpiece 122, the cutting teeth 161 proximate the first axial end 164 may contact the workpiece 122. The tap 110 may be rotated about the axis 111 while continuing to advance axially along the axis 111 (FIG. 4). The teeth 161 of the tap 110 may cut a plurality of threads 141 in the inner diameter surface 195 of the expanded hole 120. The teeth 161 may cut and remove material from the workpiece 122 to cut the threads 141. Chips 149 of the material may be received in the chip openings 169 and may move therein along the axis 111 toward the second end 116. Thus, the hole 120 may be threaded (e.g., with thread cuttings) within the zone 199 that was prepared by the reamer portion 112. In other words, the threads 141 may be cut into the zone 199 having increased residual stress from the work performed by the reamer portion 112. The threads 141 may be contained radially within the zone 199 (i.e., the major diameter of the thread may be, at most, equal to the third width 194). The threads 141 may be cut within the zone 199 of increased residual stress. As a result, the threaded hole may exhibit high fatigue resistance and high load retention strength.

It will be appreciated that the thread cutting portion 114 may be configured to cut the threads 141 at a known minor diameter and known major diameter. Those having ordinary skill in the art will understand that the minor diameter is measured with respect to the axis 111 and is the smallest diameter defined at peaks or crown tips of the cut threads 141 and that the major diameter is measured with respect to the axis 111 and is the largest diameter defined at the roots of the cut threads 141. It will be understood, therefore, that the teeth 161 on the tap 110 may have a major diameter that is equal to the major diameter of the threads 141 and a minor diameter that is equal to the minor diameter of the threads 141. In some embodiments, the minor diameter of the cutting portion 114 may be chosen to be approximately equal to the second width 192 of the hole 120. Also, in some embodiments, the major diameter of the cutting portion 114 may be chosen to be, at most, equal to the third width 194 of the hole 120. Accordingly, the threads 141 may be cut within the densified zone 199.

The dimensions of the reamer portion 112 and those of the thread cutting portion 114 (including relative dimensions) may be chosen for the tap 110 to provide the hole 120 with desired characteristics. In some embodiments, the width 152 of the reamer portion 112 at the second axial end 156 may be, at most, two percent (2%) larger than the width 152 at the first axial end 154. Arranged as such, the reamer portion 112 may expand the hole 120, at most, approximately two percent (2%) during use. Additionally, in some embodiments, the width 162 of the thread cutting portion 114 may be, at most, one to two millimeters (1-2 mm) larger than the width 152 of the reamer portion 112 at the second axial end 156. Additionally, the tap 110 may be configured with larger taper angles 158, 168 may be provided for a workpiece 122 that has higher material ductility. In contrast, the tap 110 may be configured with a smaller taper angles 158, 168 for a workpiece 100 that has higher hardness. Likewise, if the hole 120 is a blind hole, then the tap 110 may be configured with a cutting portion 114 having a smaller length 160. Likewise, the tap 110 may be configured with larger taper angles 158, 168 in cases in which the hole 120 is a blind hole, whereas the taper angles 158, 168 may be smaller in cases in which the hole 120 is a through-hole.

In some embodiments, the reamer portion 112 and thread cutting portion 114 may have common material characteristics. For example, the reamer portion 112 may be made of the same material as the thread cutting portion 114 (e.g., tool steel). Also, the portions 112, 114 may have a common coating, heat treatment, material hardness, etc. In these embodiments, the tap 110 may be constructed by forming the reamer portion 112 and the thread cutting portion 114 on a single, common shaft 130, and the portions 112, 114 may be subjected to the same heat treatment, coatings, etc. As such, the reamer portion 112 and the thread cutting portion 114 may be integrally connected and may have common material characteristics.

In alternative embodiments, the reamer portion 112 and the thread cutting portion 114 may have different material characteristics. For example, in some embodiments, one of the portions 112 114 may have higher material hardness than the other. One or more hardened surfaces may be included and may have a hardness of at least RC48. Also, in some embodiments, the reamer portion 112 may have higher material toughness than the thread cutting portion 114. To provide the portions 112, 114 with different material characteristics, the portions 112, 114 may be formed separately from different materials and then fixedly attached (e.g., by welding). In further embodiments, the tap 110 may be formed using additive manufacturing techniques, and these techniques may be utilized for forming the tap 110 with the portions 112, 114 attached and with different material characteristics. In further embodiments, one of the portions 112, 114 may be subjected to a different heat treatment from the other to provide the different material characteristics (e.g., one may receive a first heat treatment and the other may receive a different second heat treatment or one may be heat treated but not the other). In additional embodiments, one of the portions 112, 114 may be coated different from the other to provide the different material characteristics (e.g., one may have a first coating and the other may have a different second coating, or one may be coated but not the other). Coatings for the portions 112, 114 may be chosen from a group consisting of titanium nitride (TiN), titanium carbo-nitride or carbo-nitride (TiCN), chrome plate, nitride, aluminum chromium nitride (AlCrN), and aluminum chromium titanium nitride (AlCrTiN) in some embodiments. TiN, for example, may be chosen for increasing chip flow when threading softer materials. TiCn may be chosen for its high hardness and wear resistance. Also, chrome plate may be chosen for its anti-friction properties. Nitride may be chosen for its high hardness. AlCrN may be chosen for its thermal properties. AlCrTiN may be chosen for its thermal and/or wear resistance characteristics. Also, TiCN and/or TiN may be chosen for its thermal properties and high hardness properties.

Methods of manufacturing the hybrid tap 110 will now be discussed according to example embodiments and in reference to FIGS. 5-7. In some embodiments, the shaft 130 may be unitary and provided with a smooth outer surface. The shaft 130 may then be machined (i.e., material removed) to form the cutting teeth 161, the chip openings 169, and/or other features of the tap 110. Then, in some embodiments, the tap 110 may be polished, heat treated, coated, and/or otherwise processed. In some embodiments, these methods may cause the reamer portion 112 and the thread cutting portion 114 to have common material characteristics.

Figure 5:
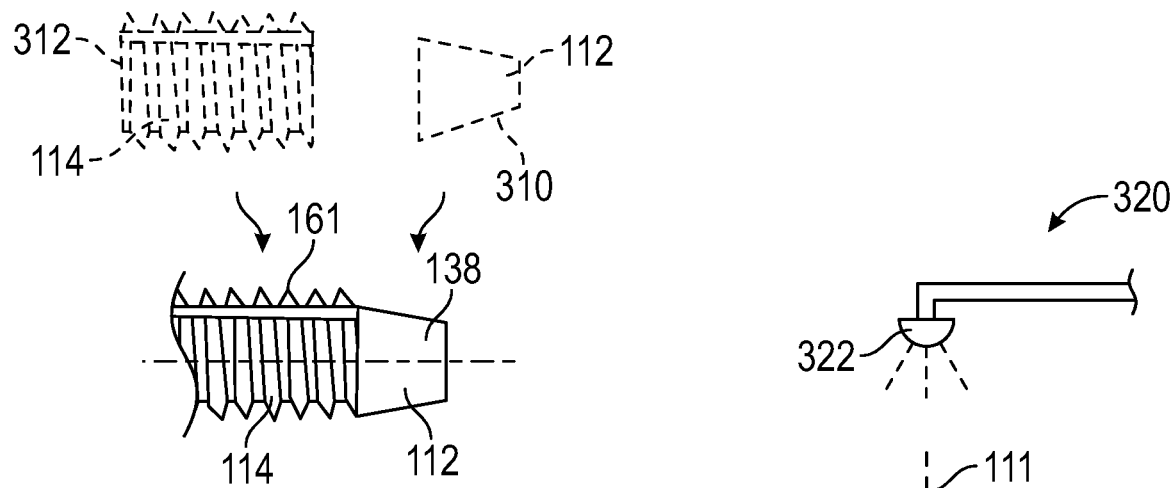
FIG. 5 is a schematic side view of a method of manufacturing the hybrid threading tool of FIG. 1.

In additional embodiments represented in FIG. 5, the reamer portion 112 and the thread cutting portion 114 may be formed separately (shown in phantom). The tapered outer radial surface 138 of the reamer portion 112 may be formed on one body 310, and the cutting teeth 161 of the thread cutting portion 114 may be formed on another body 312. Then, the reamer portion 112 and the thread cutting portion 114 may be joined end-to-end. In some embodiments, the reamer portion 112 and the thread cutting portion 114 may be fixedly attached via welding. Furthermore, in some embodiments, the thread cutting portion 114 may be formed from one material, and the reamer portion 112 may be formed from another material. For example, the thread cutting portion 114 may be formed from a material that has a higher material hardness than that of the reamer portion 112. Also, in some embodiments, the reamer portion 112 may be formed from a material that has a higher material toughness than that of the thread cutting portion 114.

Figure 6:
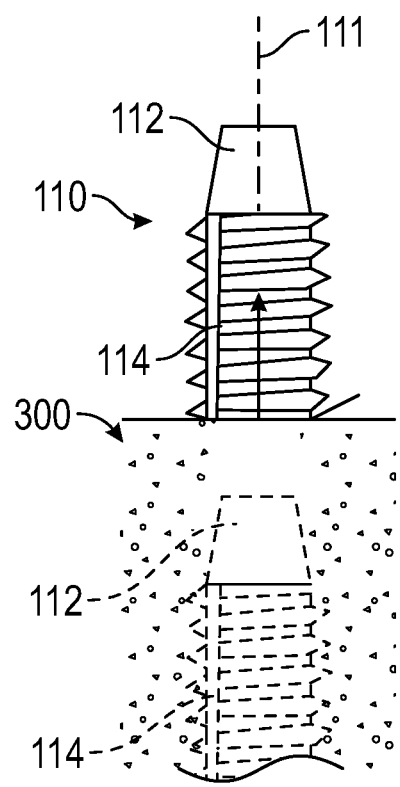
FIG. 6 is a schematic side view of the method of manufacturing the hybrid threading tool of FIG. 1 according to additional example embodiments.

In further embodiments illustrated in FIG. 6, the tap 110 may be additively manufactured. For example, an additive manufacturing device 320 may be used. An emitter 322 may emit energy toward a bed 300 of powder material to form the tap 110 layer-by-layer. The tap 110 may be constructed additively and may grow progressively. In the illustrated embodiment, the tap 110 may be formed progressively along the axis 111; however, in other embodiments, the tap 110 may be formed progressively in another direction (e.g., perpendicular to the axis 111). This process may be convenient and highly efficient. Also, this additive manufacturing process may provide the portions 112, 114 with common material characteristics. In other embodiments, the additive manufacturing process may provide the portions 112, 114 with different material characteristics. In further embodiments, the additive manufacturing process may be used to form the portions 112, 114 separately, and once formed, the portions 112, 114 may be attached end-to-end (e.g., by welding).

Figure 7:
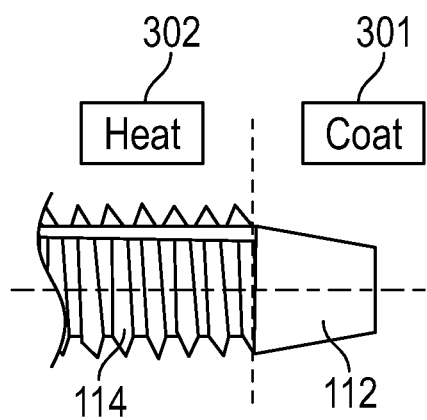
FIG. 7 is a schematic side view of the method of manufacturing the hybrid threading tool of FIG. 1 according to additional example embodiments.

Moreover, in embodiments illustrated in FIG. 7, manufacture of the tap 110 may include use of a heat treatment device 302. In some embodiments, the heat treatment device 302 may be used to provide at least one heat treatment to the tap 110. In some embodiments, the portions 112, 114 may both be heat treated in the same manner to have common material characteristics. In other embodiments, the portions 112, 114 may be heat treated differently to provide different material characteristics. Also, in some embodiments, one of the portions 112, 114 may be heat treated instead of the other to provide different material characteristics. Furthermore, to provide different material characteristics, the heat treatment device 302 may be used to heat treat at least one portion 112, 114 while separated, and then the portions 112, 114 may be subsequently attached end-to-end (e.g., by welding).

Likewise, as shown in FIG. 7, manufacture of the tap 110 may include use of a coating device 301. In some embodiments, the coating device 301 may be used to provide at least one coating to the tap 110. In some embodiments, the portions 112, 114 may be coated with a common coating. In other embodiments, the portions 112, 114 may be provided with different coatings to provide different material characteristics thereto. Also, in some embodiments, one of the portions 112, 114 may be coated instead of the other to provide different material characteristics thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A hybrid threading tap that defines a longitudinal axis, the hybrid threading tap configured to expand and thread a hole in a part, the hybrid threading tap comprising:
   a reamer portion with a leading end, a first junction end spaced apart along the longitudinal axis from the leading end, and an outer radial surface, the leading end sized to advance into the hole for abutment of the outer radial surface against an inner radial surface of the hole; and
   a thread cutting portion having a second junction end that is attached to the first junction end at a junction, the thread cutting portion having a plurality of cutting teeth, the thread cutting portion arranged with the reamer portion along the longitudinal axis;
   the reamer portion configured for the leading end to enter into the hole, thereby allowing the outer radial surface to advance into the hole and abut against an inner surface of the hole to plastically deform and expand the hole to an expanded hole and provide the expanded hole with a zone of residual compressive stress;
   the plurality of cutting teeth configured to cut a threading into the expanded hole within the zone; and
   the reamer portion and the thread cutting portion having different material characteristics that are different at the junction.

2. The hybrid threading tap of claim 1, wherein the outer radial surface of the reamer portion comprises a smooth outer radial surface.

3. The hybrid threading tap of claim 2, wherein the smooth outer radial surface is tapered with respect to the longitudinal axis.

4. The hybrid threading tap of claim 3, wherein the thread cutting portion is tapered along the longitudinal axis.

5. The hybrid threading tap of claim 4, wherein the outer radial surface of the reamer portion defines a first taper angle with respect to the longitudinal axis, and wherein the thread cutting portion defines a second taper angle with respect to the longitudinal axis; and
   wherein the first taper angle is different from the second taper angle.

6. The hybrid threading tap of claim 1, wherein the thread cutting portion is arranged end-to-end with the reamer portion along the longitudinal axis.

7. The hybrid threading tap of claim 1, wherein the reamer portion has a trailing end, wherein the leading end has a leading width, and wherein the trailing end has a trailing width; and
   wherein the trailing width is, at most, two percent (2%) larger than the leading width for expanding the hole, at most, two percent (2%).

8. The hybrid threading tap of claim 1, wherein the reamer portion and the thread cutting portion are made of different materials.

9. The hybrid threading tap of claim 1, wherein one of the reamer portion and the thread cutting portion has a different heat treatment from the other to provide the different material characteristics.

10. The hybrid threading tap of claim 1, wherein one of the reamer portion and the thread cutting portion has a different coating from the other to provide the different material characteristics.

11. The hybrid threading tap of claim 1, wherein the plurality of cutting teeth is arranged in a first land and a second land with a chip opening separating the first land and the second land in a circumferential direction about the longitudinal axis, the chip opening extending along the longitudinal axis through the thread cutting portion and configured to receive chips during cutting of the threading into the expanded hole.

12. A hybrid threading tap that defines a longitudinal axis, the hybrid threading tap configured to expand and thread a hole in a part, the hybrid threading tap comprising: a reamer portion with a leading end, a trailing end, a first junction end spaced apart along the longitudinal axis from the leading end, and an outer radial surface with respect to the longitudinal axis, the leading end sized to advance into the hole for abutment of the outer radial surface against an inner radial surface of the hole, wherein the leading end has a leading width, wherein the trailing end has a trailing width; wherein the trailing width is, at most, two percent (2%) larger than the leading width; and a thread cutting portion having a second junction end that is attached end-to-end to the first junction end at a junction, the thread cutting portion having a plurality of cutting teeth, the thread cutting portion arranged with the reamer portion along the longitudinal axis, the plurality of cutting teeth arranged in a first land and a second land with a chip opening separating the first land and the second land in a circumferential direction about the longitudinal axis, the chip opening extending along the longitudinal axis through the thread cutting portion; the reamer portion configured for the leading end to enter into the hole and for the outer radial surface to advance into the hole to plastically deform and expand the hole to an expanded hole and provide the expanded hole with a zone of residual compressive stress; and the plurality of cutting teeth configured to cut a threading into the expanded hole within the zone, the chip opening configured to receive chips during cutting of the threading into the expanded hole; and the reamer portion and the thread cutting portion having different material characteristics that are different at the junction.

13. The hybrid threading tap of claim 12, wherein the outer radial surface of the reamer portion comprises a smooth outer radial surface.

14. The hybrid threading tap of claim 13, wherein the smooth outer radial surface is tapered with respect to the longitudinal axis.

15. The hybrid threading tap of claim 14, wherein the thread cutting portion is tapered along the longitudinal axis.

16. The hybrid threading tap of claim 15, wherein the outer radial surface of the reamer portion defines a first taper angle with respect to the longitudinal axis, and wherein the thread cutting portion defines a second taper angle with respect to the longitudinal axis; and wherein the first taper angle is different from the second taper angle.

* * * * *